(No Model.)  W. T. FOX.  3 Sheets—Sheet 1.
METER.

No. 450,567.  Patented Apr. 14, 1891.

WITNESSES:
Alex J. Stewart
Alvan Macauley

INVENTOR
William T. Fox
BY
Church & Church
HIS ATTORNEYS (No Model.)　　　　　　　　　　　　　　　　3 Sheets—Sheet 2.
W. T. FOX.
METER.
No. 450,567.　　　　　　　　　　Patented Apr. 14, 1891.
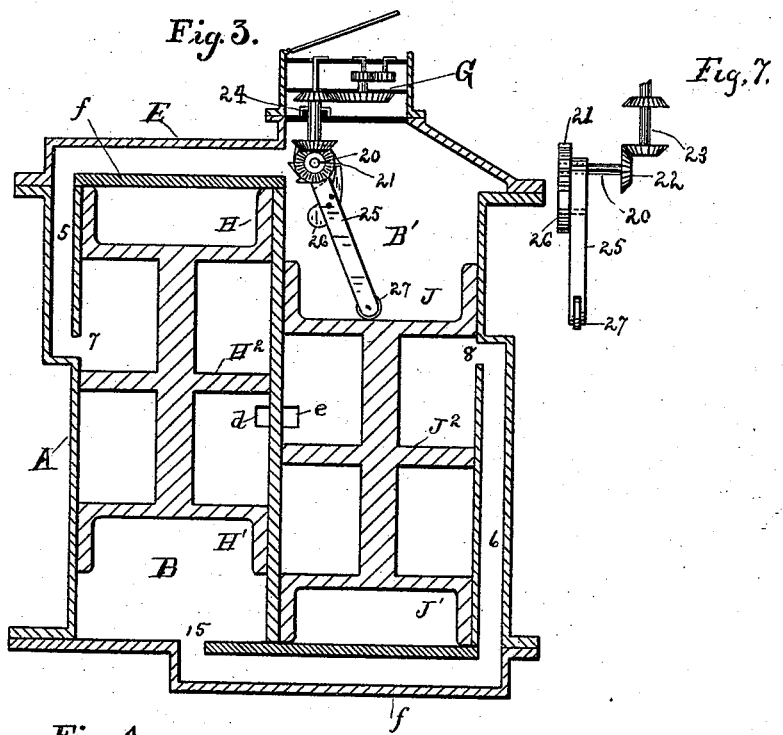
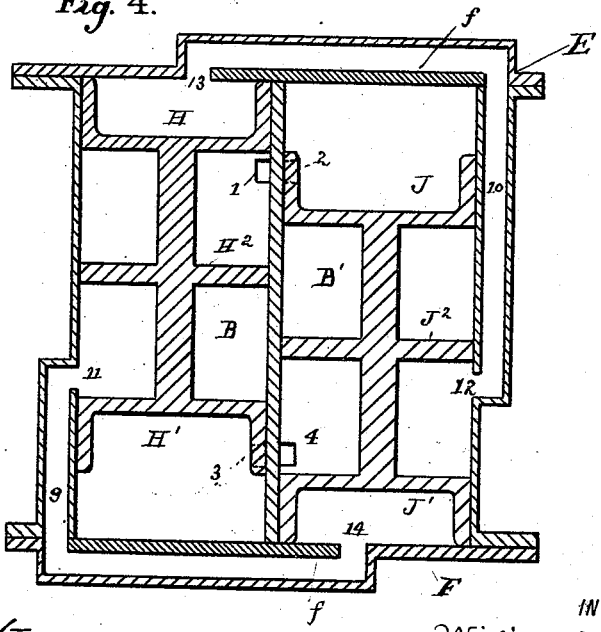
WITNESSES:　　　　　　　　　　　INVENTOR
　　　　　　　　　　　　　　　William T. Fox,
　　　　　　　　　　　　　　　BY
　　　　　　　　　　　　　　　　ATTORNEYS.

(No Model.) 3 Sheets—Sheet 3.

W. T. FOX.
METER.

No. 450,567. Patented Apr. 14, 1891.

WITNESSES:
Aly J Stewart
Alvan Macauley

INVENTOR
William T. Fox
BY
Church & Church
ATTORNEYS.

THE NORRIS PETERS CO., PHOTO-LITHO., WASHINGTON, D. C.

UNITED STATES PATENT OFFICE.

WILLIAM T. FOX, OF ROCHESTER, NEW YORK.

METER.

SPECIFICATION forming part of Letters Patent No. 450,567, dated April 14, 1891.

Application filed December 13, 1890. Serial No. 374,584. (No model.)

*To all whom it may concern:*

Be it known that I, WILLIAM T. FOX, of Rochester, in the county of Monroe and State of New York, have invented certain new and useful Improvements in Meters; and I do hereby declare the following to be a full, clear, and exact description of the same, reference being had to the accompanying drawings, forming a part of this specification, and to the figures and letters of reference marked thereon.

My present invention has for its objects to provide an improved meter for liquids that shall be simple and cheap in construction, accurate in its measurements, and shall be entirely free from the objectionable "hammer" due to the sudden stoppage of the liquid in one direction through it; and to these ends it consists in certain novelties of construction and combinations of parts, all as will be hereinafter fully described, and the novel features pointed out in the claims at the end of this specification.

Figure 1:
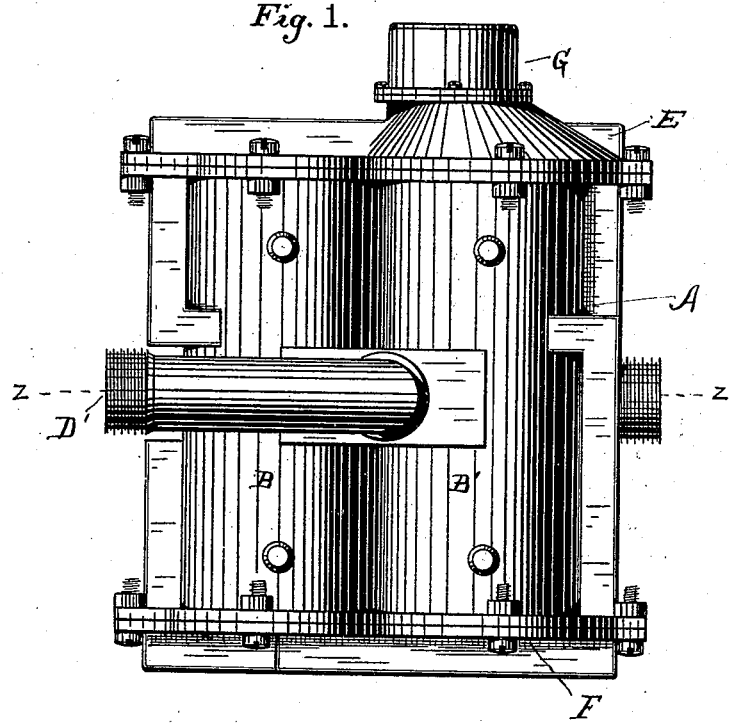
Figure 2:
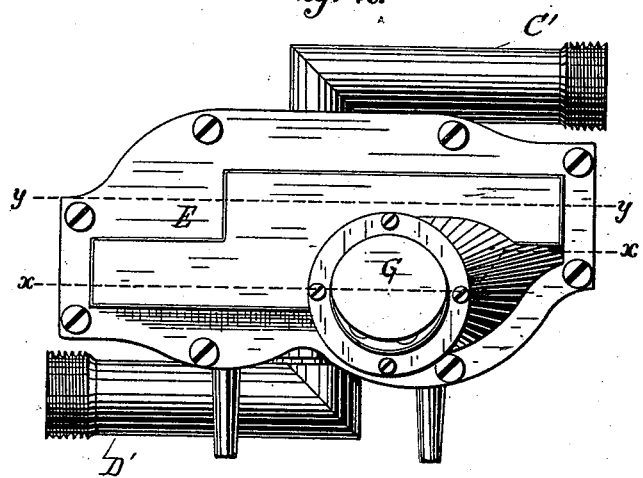
Figure 5:
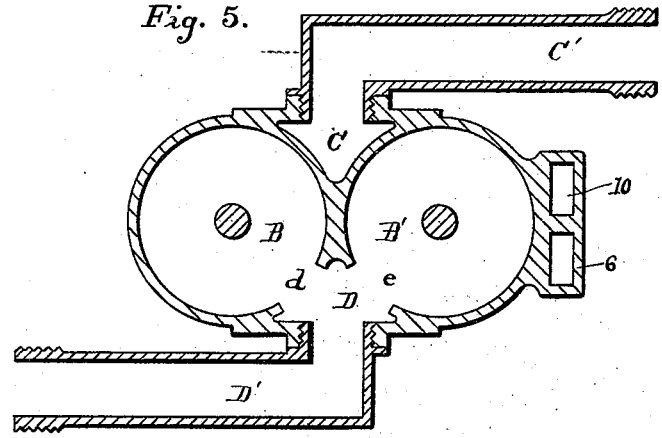
Figure 6:
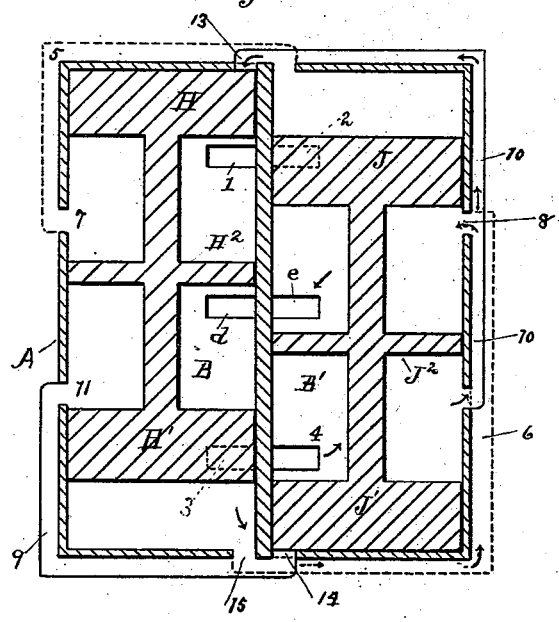

Referring to the drawings, Figure 1 is a side elevation of a meter constructed in accordance with my invention; Fig. 2, a plan view of the same; Fig. 3, a sectional view on the line $x\ x$ of Fig. 2; Fig. 4, a similar view on the line $y\ y$ of Fig. 2; Fig. 5, a cross-sectional view on the line $z\ z$ of Fig. 1; Fig. 6, a diagrammatic section showing the valve-passages and illustrating the mode of operation; Fig. 7, a detail view of the register-operating devices.

Similar letters and figures of reference indicate similar parts.

The main body or casing A of the meter consists of a casting provided with two chambers or cylinders B B', arranged parallel and extending clear through the body, and also a chamber or passage C, cored out of the body and extending from end to end thereof and communicating with the cylinders at opposite ends through ports 1, 2, 3, and 4, ports 1 and 3 opening into the cylinder B, and 2 and 4 into cylinder B', near opposite ends, as shown. On the opposite side of the casing from chamber C is another chamber or passage D, opening into the two cylinders B B' at the center through ports $d$ and $e$, and pipes C' and D' are screwed into the casing A, communicating with said chambers C and D, and serving, preferably, as the inlet and outlet pipes, respectively.

Formed in the casing A is a series of liquid-passages, presently specifically described, arranged to co-operate with corresponding chambers or passages in the end plates or castings E and F, the end piece E carrying the registering mechanism, (indicated by G,) and which may be of the ordinary or any preferred construction.

It will be noted that the cylinders B B', in which the pistons operate, are open straight through the body-casting A, and that the valve-passages open also on the ends, thereby materially facilitating the construction of said body, and that the end plates have the passages or channels in their faces, which may either be formed by casting with cores or else may be left open and closed by plates or covering-pieces indicated by $f$, as shown, which plates may also be extended and serve as packing between the end plates and body.

Operating within the cylinders B B' are pistons, the one in the former having operating-heads H H' and the intermediate valve disk or head $H^2$, and the one in cylinder B' having heads J J' at the ends and the central valve disk or head $J^2$, as shown, both pistons being the same in all respects and preferably constructed of hard rubber.

The valve passages and ports when the parts are put together in operative position are arranged and extend as follows: Just above the center of cylinder B, on the outside, are arranged ports 7, communicating by channel or passage 5 with the upper end of cylinder B', and just below the center of said cylinder B is a port 11, communicating by channel 9 and port 14 with the other end of said cylinder B', and in cylinder B' just above the middle is formed port 8, communicating by passage 6 with port 15 at the lower end of cylinder B and just below the middle, port 12 communicating by passage 10 with port 13 at the upper end of cylinder B. As stated, the inlet-pipe C' communicates through chamber C and ports 1, 2, 3, and 4 with the cylinders B B' near opposite ends, the space between said ports and the ends of cylinders and the width of the piston-heads H' and J' being so arranged relatively that when the pistons are at the extremes of movement, two of the ports 1, 2, 3, or 4, as the case may be, are open and will continue so until the movement of the piston closes them and opens the other two, as will be understood.

The operation of the parts will now be understood, reference being had particularly to Fig. 6, which is a diagrammatic view showing all the valve apertures and passages. Assuming the parts in the position in said figure and the pressure in pipe C', the water entering chamber C will pass through ports 1 and 4 into the space between heads H and H², thence through port 7 and passage 5 to the top of piston J, moving the latter down, and at the same time the water entering through port 4 passes through port 12, passage 10, and port 13 to the top of piston H, which, however, has reached the limit of its stroke. The water below piston H' is by the movement of piston H forced through port 15, passage 6, and port 8 to exit-port $e$, chamber D, and pipe D', and as the piston moves down the head H gradually closes the inlet-port 1, while head H' gradually opens port 3, allowing the water under pressure to enter between heads H' and H² and pass by port 11, passage 9, and port 14 to the lower side of piston J', raising the latter and forcing the water above J through passage 5, port 7, and exit-port $d$, the disk or head H² being below the latter during the latter part of the stroke, and so the operation will continue as long as the fluid under pressure is supplied, the piston-heads H H' and J J' controlling the inlet and heads or disks H² J² the outlet, and the latter piston-heads also serving, as shown, to in a measure balance the pistons and prevent any shock or sudden movement, rendering the operation smooth and regular.

Of course any desired form of registering mechanism can be employed that will serve to register the motions of the pistons, and in Figs. 1, 2, and 3 I have shown one form of device available for the purpose, consisting of a shaft 20, arranged to turn in bearings in the plate or casting E, having a ratchet-wheel 21 thereon, and a bevel-wheel 22, meshing with a corresponding wheel on a vertical shaft 23, passing through a suitable stuffing-box 24 and into the casing for the registering-wheels, as in Fig. 3. Mounted loosely on the shaft 20 is an arm 25, carrying a pivoted gravitating-pawl 26, adapted to engage and actuate the ratchet-wheel upon the upward movement of the arm 25, said arm being provided on its lower end with a suitable roller 27 and in contact with the piston-head J, the operation of the parts being when the piston is raised the arm will rotate the shaft 20, and thereby actuate the registering mechanism, the arm 25 following the piston $d$ down again and the pawl slipping over the teeth of the ratchet, as will be understood, a suitable pawl being, of course, provided for preventing backward movement of the register.

While it is desirable, it is not necessary to run the meter employing the pipe C as the inlet and D' as the outlet, as it may be reversed and will operate equally well.

I find in practice that this form of meter, which is exceedingly simple, will accurately measure the liquid passing through it, and the friction of the parts is very slight, so that the pressure will not be reduced appreciably, and, furthermore, as the construction is such that the pistons are balanced and one side of the interior piston-head of each piston is in contact with the pressure all the time all jar and shock incident to the cutting off of the pressure on the extreme heads will be avoided and the device will run smoothly and the fluid will be delivered without a break in the stream.

It will be noted that the whole meter consists of only five parts aside from the registering mechanism, and that it can be readily put together or taken apart by an unskilled person for the purpose of repair or cleansing, that these are simple and easily constructed, and that no matter what the position of the meter may be it will operate equally well the valves and pistons, being self-contained and not requiring any especial setting or grinding to make them operate perfectly. Of course this same construction could as well be employed for a hydraulic motor, if desired, and on account of its simple operation is especially adapted for this purpose.

I claim as my invention—

1. The combination, with the two cylinders, of the pistons operating therein, each having three heads, ports near the ends of the cylinders with which the outer heads of the pistons co-operate, ports with which the intermediate heads co-operate, and passages connecting the ends of each of the cylinders beyond the outer piston-heads with the other cylinder between the outer piston-head and the intermediate or middle head, substantially as described.

2. The combination, with the two cylinders, each having inlet and outlet ports and a series of passages leading from the outer end of each cylinder to near the central portion of the other, of the two pistons, each having heads at the ends co-operating with the inlet-ports and the intermediate head co-operating with the outlet port and passages connecting the end of each cylinder with the space between the intermediate piston-head of the other cylinder and the opposite end head thereof, substantially as described.

3. The combination, with the main casing embodying the two cylinders, open at the ends, and the valve-channels also formed in said casing and open at the ends of the end plates or castings formed with the valve-passages therein, a registering mechanism carried by one of said plates and the two pistons operating in the cylinders, one of which actuates the registering mechanism, and valves actuated by the pistons controlling their operation, substantially as described.

4. The combination, with the casing embodying the two cylinders and the valve-channels 5, 6, 9, and 10, the ports 7, 8, 11, and 12, the chamber C, connected with the liquid, inlet, having ports 1, 2, 3, and 4 connected therewith, the ports d e, connected with the outlet D, and the plates E F, having the channels therein communicating with those in the casing and constituting the ends for the cylinders, of the two pistons, each having the three heads thereon co-operating with the ports, substantially as described.

WILLIAM T. FOX.

Witnesses:
    FRED F. CHURCH,
    G. ADELE RODA.